Sept. 27, 1949.                K. McILWAIN                 2,483,097
                    POSITION INDICATOR FOR AIRBORNE TRAFFIC
Filed Sept. 12, 1946                              2 Sheets-Sheet 1
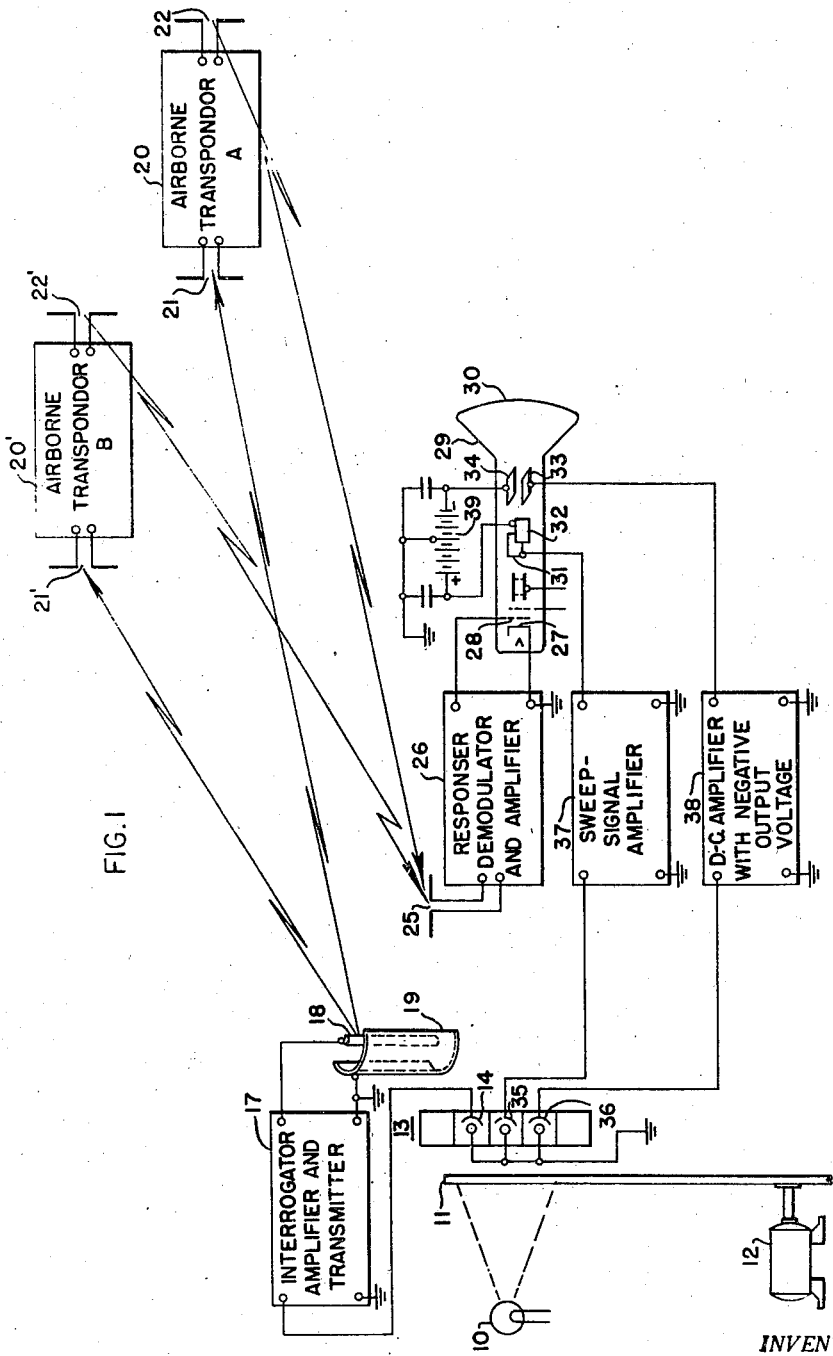
INVENTOR.
KNOX McILWAIN
BY *Harry C. Page*
ATTORNEY Sept. 27, 1949. K. McILWAIN 2,483,097
POSITION INDICATOR FOR AIRBORNE TRAFFIC
Filed Sept. 12, 1946 2 Sheets-Sheet 2
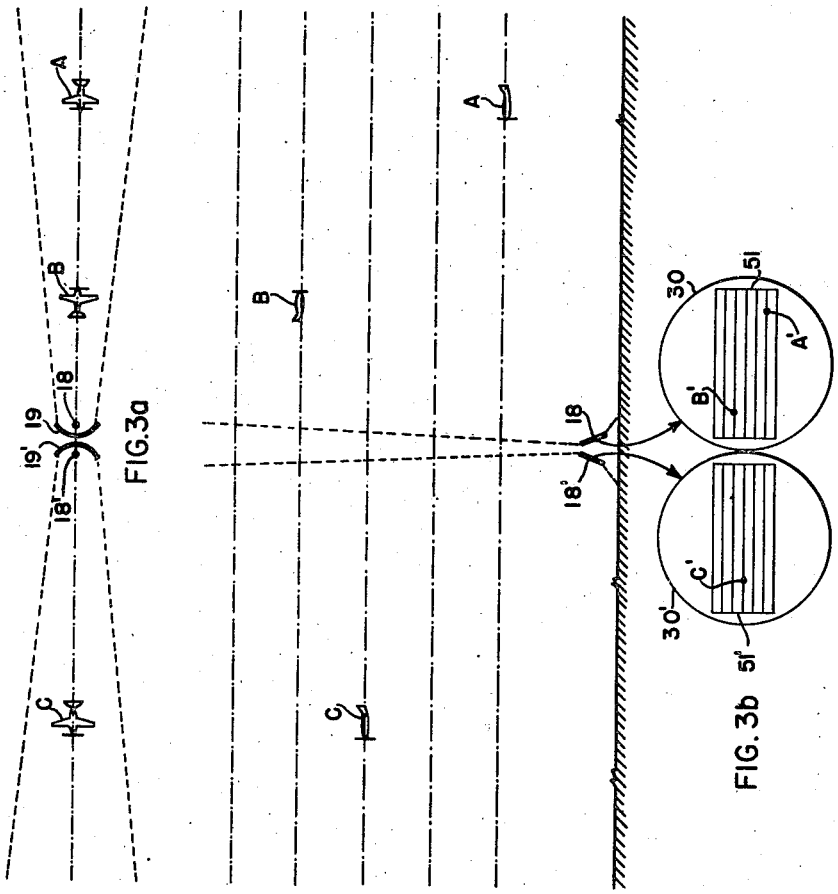
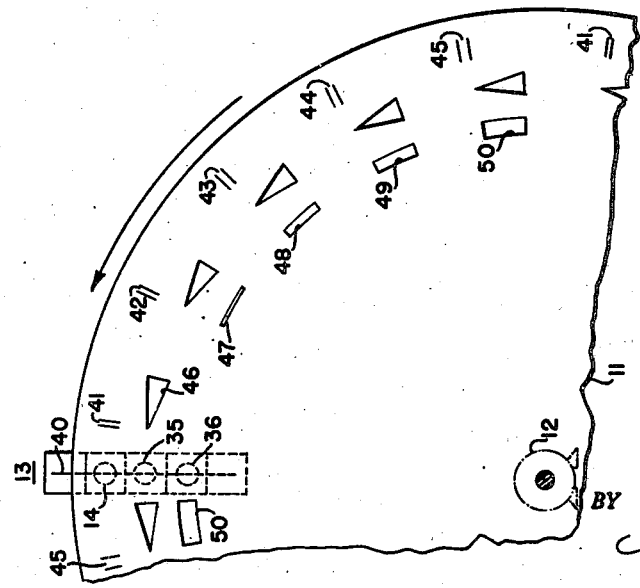
INVENTOR.
KNOX McILWAIN
BY
ATTORNEY Patented Sept. 27, 1949

2,483,097

UNITED STATES PATENT OFFICE 2,483,097

POSITION INDICATOR FOR AIRBORNE TRAFFIC

Knox McIlwain, New York, N. Y., assignor to Hazeltine Research, Inc., Chicago, Ill., a corporation of Illinois Application September 12, 1946, Serial No. 696,593

6 Claims. (Cl. 343—11)

This invention relates to a position indicator for airborne traffic, and particularly to such an indicator for showing the range from an indicator station and the altitude of each aircraft in flight located in a given direction from that station.

The density of airborne traffic has increased to such an extent that definite airways have been defined between important centers of population and various navigational aids and controls have been provided along the airways. These airways may be defined as strips of a more or less definite width laid out on a map along heavily traveled routes and extending upward to high altitudes. Among the navigational aids provided along such an airway may be mentioned visible beacons, highly directional radio transmissions in the form of radio ranges differently modulated on either side of the airway, and fan markers indicating specific points along the airway. Controls imposed along the airways may include a requirement for filing flight plans and following a flight schedule under conditions of poor visibility, and it is customary to restrict to different altitude levels aircraft flying in different directions along the airway.

When only such navigational aids and controls are used, the persons responsible for coordination of traffic along the airway must rely for information as to the positions of aircraft along the airway merely on estimates based on the flight plans, on reports from the airports of call of the aircraft, and on estimates of position received intermittently by radio from the operators of the aircraft. Obviously great changes may occur in the altitude and horizontal position of any aircraft along the airway during intervals between the receipt of reliable position and altitude reports, and the safety of all aircraft within the airway is endangered if the calculations of the traffic coordinator prove to be greatly in error. Moreover, under certain conditions an aircraft may stray from the airway without the knowledge of either its operators or the ground personnel, making it impossible for the latter to direct the lost aircraft to an airport or to protect it from collision with other aircraft or with the ground. Furthermore, due to the extensive installations of navigational aids required and to the complexity of the control procedure involving approval of flight plans, it is impractical to extend the protection now afforded along airway to other temporary routes which may handle unusually heavy airborne traffic at certain times.

It therefore is highly advisable that ground personnel interested in airborne traffic be able to determine the distribution of traffic along an airway or other flight route at any time, preferably by automatic means. Some indication of the positions of aircraft in the neighborhood of an airway may be obtained using apparatus of the radar type. A station including such apparatus periodically emits pulses of wave energy, the time required for reflected pulses to return to the station being a measure of the range of the reflecting aircraft from the station. However, it is impractical to determine the altitude of the aircraft merely by using radar apparatus with an antenna having vertical directivity, since at a range of 50 miles an altitude stratum covering a thousand feet of height subtends an angle of less than one-quarter of a degree at a ground station, and the vertical direction of propagation of reflected signals may be considerably confused by random reflections from the ground during propagation between the aircraft and the ground station.

A more practical system for ascertaining both range and height of aircraft utilizes automatic equipment installed in the aircraft which, in response to interrogating signals from a station located at a predetermined point, transmits information to that point indicating the height of the aircraft and preferably also indicating the horizontal position or range of the aircraft. Such a system, utilizing wave signals coded in such a way as to identify individual altitude strata, is described in my application Serial No. 617,020, filed September 18, 1945, and assigned to the same assignee as the present invention. In applying such a system to the coordination of airborne traffic, the air may be divided into any desired number of altitude levels or contiguous altitude strata, the aircraft in successive strata being interrogated in a rapidly recurring sequence. In this way information indicating their locations is received from the aircraft in the various altitude strata in succession. Several arrangements of this type for interrogating and receiving position information from all aircraft within range and displaying the information according to altitude classification are described in a copending application Serial No. 702,328, entitled "Display arrangement for an aircraft-coordinating system," filed October 9, 1946, in the name of Joseph O. Mesa and assigned to the same assignee as the present invention.

Regardless of the nature of the means used to receive information indicating the range and height of the aircraft, this information may be displayed for observation by ground personnel using conventional methods, on a plurality of display screens of the type used in radar devices, one screen being used for each height level or altitude stratum. Thus, on the conventional radar screen an indicating beam is swept along the surface of the screen and modulated by received pulses to form a visible spot at a distance along the line of sweeping of the beam corresponding to the range of the aircraft. However, coordination of airborne traffic with the aid of such a plurality of indicating screens may prove to be quite complicated, since the number of altitude strata and hence the number of screens required by such an arrangement may be considerable, varying any-where from several screens to as many as ten or more as dictated by the maximum altitude of flight under the supervision of ground personnel and by the number of feet of height included in each altitude stratum.

Accordingly, it is an object of the present invention to provide a new and improved position indicator for airborne traffic which substantially avoids one or more of the limitations of the described prior arrangements.

It is also an object of the present invention to provide a new and improved position indicator for indicating the distribution of airborne traffic located in a given direction from an indicating station.

It is a further object of the present invention to provide a new and improved position indicator for forming simplified and conveniently observable representations of the distribution of airborne traffic located along a given path such as an established airway.

In accordance with the invention, a position indicator for airborne traffic comprises receiving means located at a predetermined point for receiving during spaced time intervals from aircraft which are in flight and located exclusively in a given direction from said point information indicating their respective ranges and information transmitted from the aircraft indicating their respective heights. The position indicator also comprises a display surface, means for scanning the display surface during each of the time intervals effectively to provide on that surface a series of relatively widely spaced parallel lines such that each line thereof distinctively represents a predetermined height or flight level for the aircraft. The position indicator also includes control means responsive to the received information for so controlling the scanning means during each time interval that there are formed on the above-mentioned surface visual indications of the respective ranges by displacements of the indications along the lines and visual indications of the respective heights by the lines on which each of the indications appears.

For a better understanding of the present invention, together with other and further objects thereof, reference is had to the following description taken in connection with the accompanying drawings, and its scope will be pointed out in the appended claims.

In the drawings, Fig. 1 is a schematic representation of a traffic-coordinating system including a position indicator for airborne traffic; Fig. 2 is a partial view of the face of a control disc used in the system of Fig. 1; Fig. 3a is a plan view of a portion of the length of an airway or other flight route on which has been installed a ground station containing position indicators of the type shown in Fig. 1; and Fig. 3b is an elevational view taken along the portion of the flight route shown in Fig. 3a, display surfaces included in the indicators installed at the ground station also being shown.

Referring to Fig. 1, there is shown in schematic form a position indicator for use in a system for coordinating airborne traffic along a given flight route or airway, including an interrogator located at a ground station for challenging all properly equipped aircraft within range along the route, two transpondor equipments installed on aircraft in flight along the route within range of the interrogator, each such equipment being effective to receive interrogating signals from the interrogator and respond to them by transmitting suitable signals back to the ground station including the interrogator, and a responser at the ground station for receiving replies from the airborne equipments and forming suitable indications of their responses representing their positions. The interrogator includes a lamp 10 arranged to direct light through openings in a control disc 11, which is driven by a motor 12, the light passing to a photocell bank 13 including a pulse-generating phototube 14. Each photocell in the bank 13 has a grounded element, and the other element of pulse-generating phototube 14 is connected to an interrogator unit 17 containing an amplifier and a transmitter. The output circuit of unit 17 is connected to an antenna 18 equipped with a fixed reflector structure 19 directed so as to face down the flight route or airway.

An aircraft, which may be designated aircraft A and which is in flight within the airway and within range of the interrogator, carries an airborne transpondor A, identified by the reference numeral 20. The transpondor unit 20 has an omnidirectional receiving antenna 21 connected to its input circuit and an omnidirectional transmitting antenna 22 connected to its output circuit. Another aircraft, which may be designated aircraft B and also is in the airway within range of the interrogator, carries an airborne transpondor B, identified by reference numeral 20'. The transpondor unit 20' similarly is equipped with a receiving antenna 21' and a transmitting antenna 22'.

The responser equipment, which is adapted to receive replying signals from the transpondor units 20 and 20', includes an antenna 25 coupled to the input circuit of a responser unit 26 containing a demodulator and an amplifier. Antenna 25 may be omnidirectional or, if desired, may have directional characteristics similar to transmitting antenna 18 to eliminate extraneous noise or other signals. The output circuit of unit 26 is connected to the cathode 27 and a control electrode 28 of a cathode-ray tube 29. This cathode-ray device has a display surface in the form of a fluorescent screen 30, and is provided with a pair of horizontal-deflection electrodes 31 and 32 and a pair of vertical-deflection electrodes 33 and 34.

Photocell bank 13 includes, in addition to pulse-generating phototube 14, a sweep-signal-generating phototube 35 and a deflection-signal-generating phototube 36. The sweep-signal-generating phototube 35 is connected to the input circuit of a sweep-signal amplifier 37, whose output circuit is connected to the horizontal-deflection electrode 31 in the cathode-ray tube 29. The deflection-signal-generating phototube 36 is connected to the input circuit of a unit 38 comprising a conventional D.-C. amplifier with negative output voltage, and the output circuit of unit 38 is connected to the vertical-deflection electrode 33. There also is provided a source of deflection-biasing voltage in the form of a battery 39 having a positive terminal connected to horizontal-deflection electrode 32, a negative terminal connected to vertical-deflection electrode 34, and an intermediate electrode connected to ground.

The responser unit 26, cathode-ray device 29, and amplifiers 37 and 38, along with sweep-signal- and deflection-signal-generating and synchronizing arrangements of the control disc 11 and photocell bank 13, provide a position indicator for airborne traffic. Operation of the indicator and associated equipment is described hereinbelow following a description of the remaining figures of the drawing.

In Fig. 2 the upper right-hand quadrant and adjoining portions of the face of control disc 11 are shown. The motor 12 also is represented with its shaft connected to the center of disc 11. The stationary photocell bank 13 appears behind the disc 11. The bank 13 contains light-shielded compartments housing the phototubes 14, 35, and 36, and the front of the housing is an opaque shield having a thin slit 40 for admitting light to the row of phototubes.

On disc 11 the upper right-hand quadrant, which is about to pass in front of the slit 40, is a succession of pairs of slit-shaped openings 41—45 arranged at an extreme radius on the disc for successive alignment with pulse-generating phototube 14 during rotation of the disc. The spacing between the pairs of slits is graduated, the first pair 41 being the most closely spaced, while the last pair 45 near the other side of the quadrant is the most widely spaced. At a smaller radius for alignment with sweep-signal-generating phototube 35 are five similar wedge-shaped openings 46 arranged with the closed ends of the wedges leading and in peripheral alignment with the second slit of each pair of slits 41—45. At a still smaller radius for alignment with deflection-signal-generating phototube 36 are four openings 47—50, graduated according to increasing radial width, the leading edges of the openings being peripherally aligned with the second slit of each of the pairs of slits 42—45, respectively, while their trailing edges are aligned with the trailing edges of the corresponding wedge-shaped openings 46. The other three quadrants of control disc 11 have openings arranged in the same manner and in the same sequence. Thus the first and most closely spaced pair of slits 41 in the lower right-hand quadrant also is shown, while in the upper left-hand quadrant there are shown the last and most widely spaced pair of slits 45 and the large opening 50 which have just passed in front of photocell bank 14.

In the portion of a flight route or airway shown in plan view in Fig. 3a, the antenna 18 and its reflector 19 are depicted facing in one direction along the route or airway. In that direction two aircraft are represented in flight along the route, an aircraft A rather distant from the ground station and an aircraft B relatively near it. In addition, the ground station is equipped with a duplicate interrogator and position-indicator apparatus for determining the distribution of airborne traffic located in the other direction along the airway from the ground station. Included in this other apparatus are an antenna 18' and its reflector 19', which are similar to the antenna 18 and reflector 19 except that the reflectors face in opposite directions along the airway. An aircraft C is in flight along the airway in the section faced by reflector 19'.

In Fig. 3b, which is a view of the route or airway in side elevation corresponding to the plan view of Fig. 3a, the airway has been divided into a number of altitude levels, five being illustrated by dashed lines for convenience of illustration. The altitude levels represented by the dashed lines may represent the mean altitudes of a number of adjacent altitude strata, the boundaries between the strata being intermediate the dashed lines. The aircraft A, B, and C are represented as flying in the first, fourth, and third altitude strata, respectively. The antennas 18 and 18' are disposed so as to give coverage of the air space on both sides of the ground station with a negligible zone of silence above the station. Antenna 18 is part of the interrogator-responser equipment of Fig. 1, which includes a cathode-ray tube having the display surface 30 shown in Fig. 3b. Position indications appear in a rectangular viewing portion 51 on the surface 30, and five light horizontal lines are shown traced one above the other on the surface 30 within the portion 51. These lines correspond to the five altitude levels in the airway. Indications A' and B' representing the aircraft A and B, respectively, are visible on the display surface 30. Similarly the apparatus associated with antenna 18' includes a display surface 30' having a rectangular viewing portion 51', on which appears an indication C' in the form of a spot representing the aircraft C.

In general, the apparatus of Figs. 1 and 2, including control disc 11 with the openings 41—46 therein, the phototubes 14 and 35, interrogator unit 17, antenna 18, transpondor units 20 and 20', responser unit 26, cathode-ray tube 29, and sweep-signal amplifier 31, is analogous to the apparatus illustrated in Figs. 1 and 2 of the above-mentioned application, Serial No. 702,328, of Joseph O. Mesa, and such apparatus is described in detail in that application. Suitable circuits for various units of the apparatus are illustrated and their operation described in my above-mentioned application Serial No. 617,020. As indicated by the specifications just mentioned, the functions of the control disc 11 and photocell bank 13 may be carried out by electronic means to eliminate rapidly rotating parts. It is considered unnecessary further to describe in detail herein either the units making up the interrogating, replying, and response-receiving arrangements illustrated in the accompanying drawings or the operation of these units.

Various arrangements may be used for interrogating aircraft within an airway and for receiving therefrom position information classified according to the heights of the aircraft, as is done in the position indicator of the present invention. One way to accomplish the desired result is to interrogate with an uncoded signal, in which case all transpondors within range reply to the interrogating signals with a signal characteristically modulated according to the height of the replying aircraft. The responser then accepts at a given instant only those replying signals which are modulated with the code assigned to a single altitude stratum. However, the apparatus illustrated in Figs. 1 and 2 utilizes a preferred method, in which the interrogating signals are modulated at any given time with an altitude code and only those transpondors located on aircraft then flying within the corresponding altitude stratum transmit reply signals to the responser at that time. Whichever arrangement is user, the reply signals, either by their coding or by their association with particularly coded interrogating signals, convey information indicating which one of a number of altitude strata is occupied by each of the replying aircraft.

Describing briefly the operation of the arrangement of Figs. 1 and 2, motor 12 rotates control disc 11 in front of photocell bank 13 so that light from lamp 10 shines successively through the various openings in the disc 11 and strikes the photocell bank including pulse-generating phototube 14. Since control disc 11 rotates at a fixed speed, the pairs of slits 41—45 passing into alignment with slit 40 and phototube 14 effect the generation of pairs of pulses having spacings corresponding to the distances between the slits in each pair. The spacing between these pulses is an altitude or height code, the smallest spacing being assigned if desired to the lowest altitude stratum and the largest spacing correspondingly to the highest altitude stratum. The pulses generated in phototube 14, coded according to the various altitude strata in sequence, are amplified in interrogating unit 17 and applied in the transmitter of that unit to modulate a radio-frequency signal. This signal is fed to antenna 18 and radiated exclusively along the airway due to the action of reflector 19. For the purposes of the present specification the limits of a flight route or airway are determined by the directional characteristics of the antenna system 18, 19, which has a radiation pattern in the form of a beam whose width, of course, increases somewhat with increasing distance from the antenna.

The transpondors 20 and 20' carry barometrically controlled decoding devices permitting responses only when the aircraft is at a height within the altitude range assigned to the code spacing of the received pulses. Whenever radiated signals modulated with the proper altitude code are intercepted at antenna 21 of unit 20, that unit replies to the signals, preferably by transmitting from antenna 22 a signal having a slightly different radio frequency from that of the interrogator transmitter. Transpondor unit 20' responds in the same way, except that it accepts signals coded for its own altitude stratum and that its reply signals reach the ground station after a different elapsed time following the transmission of properly coded interrogating signals, this time depending upon the distance between the ground station and the transpondor.

Reply signals from the two transpondors are received at antenna 25 and applied to responser unit 26, where they are demodulated and amplified for application to the control electrode 28 of the cathode-ray tube 29. Accordingly the elapsed time between transmission of interrogating pulses and receipt of replying signals is a measure of the position of the replying aircraft lengthwise of the airway, while the particular pairs of coded pulses to which a given aircraft replies determines the altitude stratum occupied by the aircraft. Hence, since only aircraft within the flight route or airway are interrogated due to the directional characteristics of antenna 18, the receiving antenna 25 and responser unit 26 function as receiving means located at a predetermined point, at which the interrogator also is situated, for receiving during spaced time intervals from aircraft in flight located exclusively in a given direction from that predetermined point information indicating their respective distances or ranges from that point and information transmitted from such aircraft indicating their respective heights. If desired, the indicating apparatus may be movable so as to cover successively different portions of a flight route or routes, in which case the predetermined point or direction of observation may move. If the apparatus is installed on an airway, the receiving means receives from aircraft in flight exclusively within the given airway information indicating their respective positions along that airway, as well as information indicating their respective heights in that airway.

During propagation along the airway of each pair of interrogating pulses and the signals replying thereto, a sweep signal of saw-tooth amplitude characteristic is generated in sweep-signal-generating phototube 35 due to the light passing through slit 40 and the wedge-shaped openings 46. The sweep signals are amplified in amplifier 37 and then fed to horizontal-deflection electrode 31. The cathode-ray beam, which in the absence of a sweep signal is maintained near the left-hand side of screen 30 by the action of the biasing voltage from battery 39 on deflection plate 32, is caused to travel across screen 30 from left to right as the sweep-signal amplitude increases. Thus, lamp 10, the openings 46 in coding disc 11, phototube 35, sweep-signal amplifier 37, and the deflection electrodes 31 and 32 comprise means for scanning display surface 30 in one direction, more specifically, in a substantially horizontal direction. If during this scanning a reply signal from transpondor A or transpondor B is applied to control electrode 28, a rather bright spot appears along the line of sweeping of the cathode-ray beam at a displacement from the resting position at the left of the screen 30 corresponding to the position of the respective aircraft along the airway.

When no signal is generated in deflection-signal-generating phototube 36, the negative biasing voltage placed on vertical-deflection electrode 34 by battery 39 causes the cathode-ray beam to remain in the lower part of the screen 30. This is the case after interrogating signals corresponding to the lowest altitude stratum are transmitted, since no light strikes deflection-signal-generating phototube 36 immediately after the pair of coded slits 41 passes the photocell bank 14. However, immediately after the pair of slits 42 passes the photocell bank a small negative signal is generated in phototube 36 due to the light passing through the narrow slit 47. After amplification in unit 38 this signal is applied with negative polarity to vertical-deflection electrode 33, causing the cathode-ray beam, commencing with the transmission of pulses coded for the second altitude stratum, to follow a path of sweeping somewhat higher on the screen 30 than the path followed by the beam following transmission of pulses coded for the first stratum. Likewise, openings 48, 49, and 50 in control disc 11 cause increasingly greater upward deflections, which are maintained during the sweeping of the beam following transmission of signals coded for the next three altitude strata respectively. Accordingly there is provided for each of said altitude strata a predetermined displacement of the beam in a vertical direction, the displacement for the lowest stratum being zero if that stratum is taken as a reference. Thus, during the passage of the openings 47—50 of each quadrant of disc 11 in front of phototube 36, the disc, the phototube, D.-C. amplifier 38, and the deflection electrodes 33 and 34 cooperate to cause the cathode-ray beam to scan the surface 31 in a substantially vertical direction. Hence this arrangement, in combination with the arrangement for applying sweep signals to horizontal-deflection electrodes 31 and 32, provides means for scanning the display surface during spaced time intervals effectively to provide on the display surface a series of spaced parallel lines such that each line thereof distinctively represents a predetermined height or flight level for the aircraft. Furthermore, the phototube 36 and the amplifier 38 comprise a variable potential source which is coupled to the cathode-ray tube 29 for so controlling the tube as to provide a relatively wide spacing between each of the aforesaid parallel lines.

The action of the sweep signals and deflection signals is illustrated further in Figs. 3a and 3b. The intensity of the cathode-ray beam in the absence of reply signals preferably is adjusted so that the lines of sweeping appear as a column of faint horizontal lines on the display surface 30, as indicated within the viewing portion 51. The distant aircraft A in the first altitude stratum, responding to the coded pulses produced by the pair of slits 41, causes a spot to appear when the lowest sweep of the cathode-ray beam has almost reached the right side of the display surface, so as to form indication A'. Subsequently pulses with increasing spacing corresponding to the pairs of slits 42 and 43 are transmitted and the beam sweeps the surface 30 in horizontal lines at increasingly higher levels determined by the signals generated by the openings 47 and 48. Thereafter the pair of slits 44 effects the transmission of signals coded for the fourth altitude stratum containing aircraft B, the response signals of which cause the spot B' to appear on the display surface above the vertical center of the viewing portion 51 and only slightly displaced from the left-hand side of portion 51 because of the relative nearness of aircraft B. The pair of slits 45 then effects the transmission of signals coded for the fifth stratum and the large opening 50 causes the scanning of the corresponding line near the top of portion 51. In this way the intensity-control electrode 28 and its connection to responser unit 26 constitute control means responsive to information received by the unit 26 for so controlling the scanning by the electron beam of the cathode-ray tube 29 during each receiving time interval that there are formed on the display surface 30 visual indications of the respective ranges by displacements of the indications along the horizontal lines and visual indications of the respective heights by the lines on which each of the indications appears.

The operation of apparatus including the antenna system 18', 19' facing in the other direction along the flight route or airway is exactly the same as the operation of the first position indicator described above. However, in the other indicator, not shown in the drawings, the connections to the two horizontal-deflection electrodes corresponding to electrodes 31 and 32 may be reversed, so that the cathode-ray beam striking display surface 30' sweeps from the right-hand edge to the left-hand edge of viewing portion 51'. As illustrated in Figs. 3a and 3b, the aircraft C is in the third altitude stratum, and its reply signals cause a spot C' to appear displaced upward from the bottom of the display area by a corresponding amount, similar to the displacement resulting from the passage of opening 48 in front of deflection-signal-generating phototube 36 in the position indicator for the opposite direction along the airway. Of course, the coded pulses and corresponding replies occur once for each quadrant of coding disc 11, and the repetition rate preferably is made sufficiently high so that the spot appears to the eye to be continuously on the display surfaces.

Proper placement and adjustment of the two position indicators having display screens 30 and 30' result in alignment of the lines of sweeping on each screen corresponding to the same altitude strata. Thus the two screens, placed side by side and close together, present to the observer a picture of traffic conditions in the flight route or airway extending from the extreme range in one direction through the portion of the route near the ground station to the extreme range in the other direction. Obvious modifications of this arrangement will occur immediately to the skilled designer. For example, coding discs used in the two position indicators may be synchronized so that the interrogating and sweep signals occur first in one interrogator and then in the other, with the result that periods of time for interrogating and sweeping are shared between the two indicating systems. In such an arrangement a single cathode-ray tube and display surface may be used, a suitable tube being the tube 29, in which the connection from battery 39 to horizontal deflection electrode 32 is omitted and replaced by a connection from the sweep-signal amplifier of the other position indicator. With this arrangement the two sets of sweep signals cause the beam to start from the center of the tube and sweep to the right or left, depending on which antenna, 18 or 18', is being used at the instant.

Other ground stations may be located along the flight route; for example, a second station may be located so as to cover a portion of the route to the left of the portion represented in Figs. 3a and 3b. In that case two position indicators having screens similar to screens 30 and 30' may be used at the second station, the extreme left-hand range indicated by the screen 30' coinciding with the extreme right-hand range indicated by the indicators at the second station. If desired the second station may be arranged to supply its information to such additional screens at the first station through a transmission line or microwave radio link between the two stations, and the two sets of screens may then be placed alongside each other at the first station to give a continuous picture of traffic conditions along the route. The only information that need be dispatched from the second to the first station may be contained in the pairs of altitude-coded interrogating pulses transmitted by the second station and in the reply pulses received from the aircraft within range of the second station. These interrogating pulses then may be applied at the first station to trigger a sweep-signal generator of conventional design. The same pairs of interrogating pulses may be used at the first station to trigger on a conventional pulse generator when the first or each pair of pulses arrives and to trigger it off when the second arrives. The resulting pulses of varying lengths may be integrated using well-known circuits to obtain deflection signals corresponding to those produced by the openings 47—50, since the amplitude of the signals would be proportional to the spacing between the pulses of each pair.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A position indicator for airborne traffic comprising: receiving means located at a predetermined point for receiving during spaced time intervals from aircraft which are in flight and located exclusively in a given direction from said point information indicating their respective ranges and information transmitted from said aircraft indicating their respective heights; a display surface; means for scanning said surface during each of said time intervals effectively to provide on said surface a series of relatively widely spaced parallel lines such that each line thereof distinctively represents a predetermined height or flight level for said aircraft; and control means responsive to said received information for so controlling said scanning means during said each time interval that there are formed on said surface visual indications of said respective ranges by displacements of said indications along said lines and visual indications of said respective heights by the lines on which each of said indications appears.

2. A position indicator for airborne traffic comprising: receiving means located at a predetermined point for receiving during spaced time intervals from aircraft which are in flight exclusively within a given airway information indicating their respective positions along said airway and information transmitted from said aircraft indicating their respective heights in said airway; a display surface; means for scanning said surface during each of said time intervals effectively to provide on said surface a series of relatively widely spaced parallel lines such that each line thereof distinctively represents a predetermined height or flight level in said airway for said aircraft; and control means responsive to said received information for so controlling said scanning means during said each time interval that there are formed on said surface visual indications of said respective positions along said airway by displacements of said indications along said lines and visual indications of said respective heights by the lines on which each of said indications appears.

3. A position indicator for airborne traffic comprising: receiving means located at a predetermined point for receiving during spaced time intervals from aircraft which are in flight and located exclusively in a given direction from said point information indicating their respective ranges and information transmitted from said aircraft indicating which one of a number of flight levels is occupied by each of said aircraft; a display surface; means for scanning said surface during each of said time intervals effectively to provide on said surface a series of relatively widely spaced parallel lines such that each line thereof distinctively represents a predetermined flight level for said aircraft; and control means responsive to said received information for so controlling said scanning means during said each time interval that there are formed on said surface visual indications of said respective ranges by displacements of said indications along said lines and visual indications of which one of said respective flight levels is occupied by each of said aircraft by the line on which each of said indications appears.

4. A position indicator for airborne traffic comprising: receiving means located at a predetermined point for receiving during spaced time intervals from aircraft which are in flight and located exclusively in a given direction from said point information indicating their respective ranges and information transmitted from said aircraft indicating which one of a number of flight levels is occupied by each of said aircraft; a display surface; means for scanning said surface during each of said time intervals effectively to provide on said surface a series of relatively widely spaced horizontal parallel lines such that each line thereof distinctively represents a predetermined flight level for said aircraft; and control means responsive to said received information for so controlling said scanning means during said each time interval that there are formed on said surface visual indications of said respective ranges by displacements of said indications along said horizontal lines and visual indications of which one of said respective flight levels is occupied by each of said aircraft by the horizontal line on which each of said indications appears.

5. A position indicator for airborne traffic comprising: receiving means located at a predetermined point for receiving during spaced time intervals from aircraft which are in flight and located exclusively in a given direction from said point information indicating their respective ranges and information transmitted from said aircraft indicating their respective heights; a cathode-ray device having a fluorescent screen providing a display surface; means coupled to said cathode-ray device for effecting scanning of said surface during each of said time intervals to provide on said surface a series of relatively widely spaced parallel lines such that each line thereof distinctively represents a predetermined height or flight level for said aircraft; said cathode-ray device including control means responsive to said received information for producing on said surface during said each time interval visual indications of said respective ranges by displacements of said indications along said lines and visual indications of said respective heights by the lines on which each of said indications appears.

6. A position indicator for airborne traffic comprising: receiving means located at a predetermined point for receiving during spaced time intervals from aircraft which are in flight and located exclusively in a given direction from said point information indicating their respective ranges and information transmitted from said aircraft indicating their respective heights; a cathode-ray device having a fluorescent screen providing a display surface; means including a sweep generator coupled to said cathode-ray device for effecting scanning of said surface during each of said intervals to provide on said surface a plurality of horizontal lines and including a variable potential source coupled to said cathode-ray device for so controlling said device as to provide a relatively wide spacing between each of said plurality of lines; said cathode-ray device including control means responsive to said received information for producing on said surface during said each time interval visual indications of said respective ranges by displacements of said indications along said lines and visual indications of said respective heights by the lines on which each of said indications appears.

KNOX McILWAIN.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,248,215 | Budenbom | July 8, 1941 |
| 2,252,083 | Luck | Aug. 12, 1941 |
| 2,284,873 | Kemp | June 2, 1942 |
| 2,403,603 | Korn | July 9, 1946 |
| 2,426,189 | Espenschied | Aug. 26, 1947 |